United States Patent [19]

Koenn et al.

[11] 4,446,368

[45] May 1, 1984

[54] METHOD AND APPARATUS FOR NEUTRON INDUCED GAMMA RAY WELL LOGGING

[75] Inventors: Lawrence D. Koenn; David B. Drude, both of Houston, Tex.

[73] Assignee: Dresser Industries, Inc., Dallas, Tex.

[21] Appl. No.: 326,862

[22] Filed: Dec. 3, 1981

[51] Int. Cl.³ ............................................. G01V 5/00
[52] U.S. Cl. .................................... 250/262; 250/270
[58] Field of Search ....................... 250/269, 270, 262

[56] References Cited

U.S. PATENT DOCUMENTS

| | | | |
|---|---|---|---|
| 3,780,301 | 12/1973 | Smith et al. | 250/83.3 R |
| 3,780,302 | 12/1973 | Arnold et al. | 250/301 |
| 3,780,303 | 12/1973 | Smith et al. | 250/301 |
| 4,239,965 | 12/1980 | Oliver et al. | 250/270 |
| 4,284,886 | 8/1981 | Hertzog | 250/270 |

*Primary Examiner*—Davis L. Willis
*Attorney, Agent, or Firm*—Richard M. Byron; Patrick H. McCollum

[57] ABSTRACT

In a neutron induced gamma ray well logging instrument, a neutron generator is pulsed at a predetermined clock frequency. Each neutron burst produces inelastically scattered gamma rays and thermal neutron capture gamma rays. Inelastically scattered gamma rays are detected during a time interval coinciding with the neutron source pulsing for a first plurality of neutron bursts. Capture gamma rays are detected during a time interval subsequent to the cessation of the neutron burst for a second plurality of neutron bursts. A detection pulse is transmitted to processing circuitry during each of the detection intervals. Sync pulses generated in the well logging instrument are transmitted to the processing circuitry along with the detection pulses. The sync pulses are used to route the pulse occurring during the inelastic detection interval to one section of a multi-channel analyzer. Similarly, the pulse occurring in the capture interval is routed into another section of the multi-channel analyzer. Address decoders, subtractors and ratio circuits are used to obtain signals representative of selected elements within the irradiated formations.

28 Claims, 12 Drawing Figures

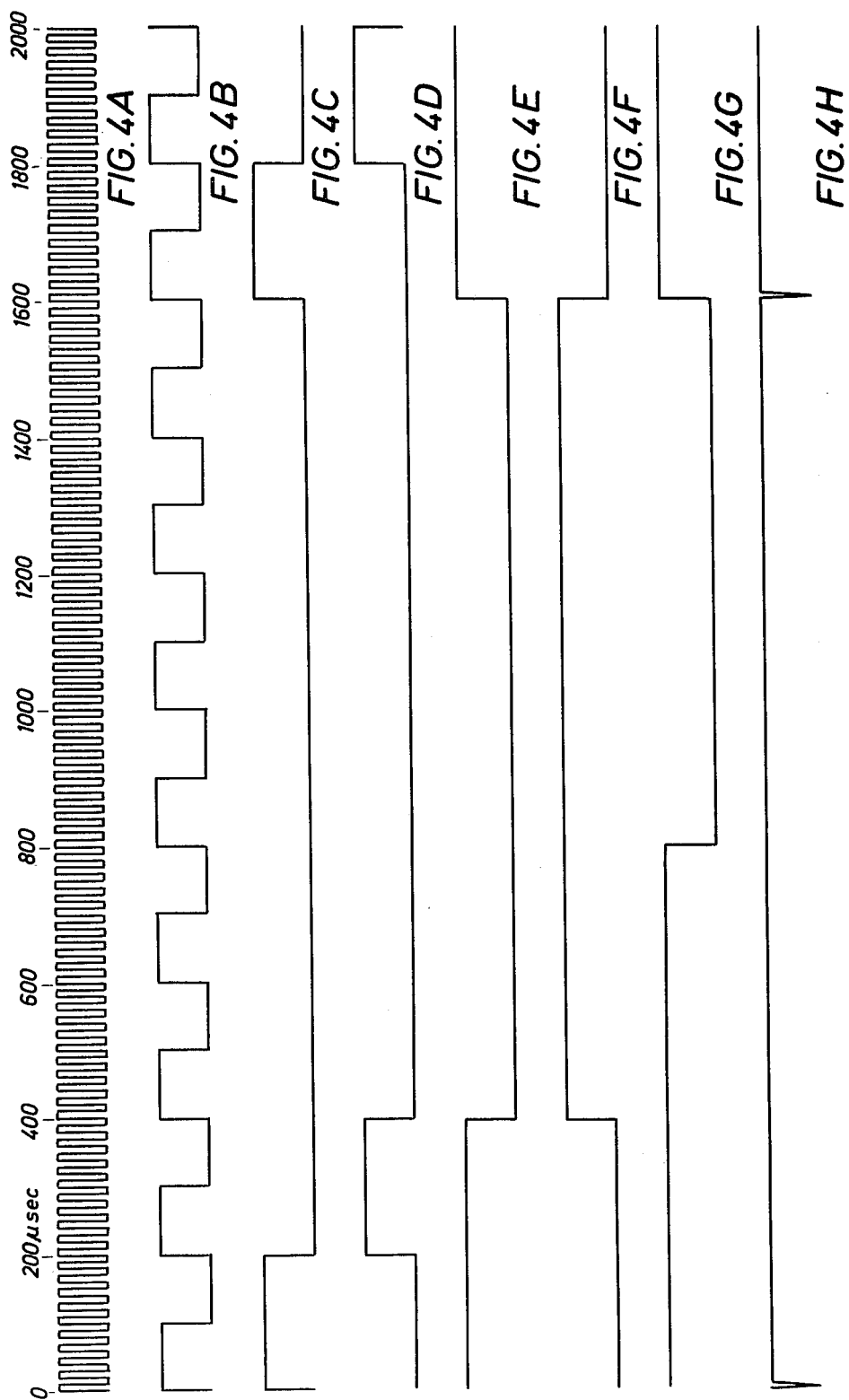

METHOD AND APPARATUS FOR NEUTRON INDUCED GAMMA RAY WELL LOGGING

BACKGROUND OF THE INVENTION

The present invention relates generally to radiological well logging methods and apparatus for investigating subsurface earth formations traversed by a borehole and, more particularly, to improved method and apparatus for high frequency pulsed neutron gamma ray logging wherein gamma radiation resulting from neutron inelastic scatterings and thermal neutron capture are selectively detected and the spectral distribution of the detected gamma radiation is determined.

A number of well logging techniques in use come under a general classification of neutron induced radiological well logging. In their basic form, these techniques involve irradiating subsurface earth formations with neutrons and then determining the effect of select formation constituents on the neutrons by measuring either gamma rays produced by inelastically scattered neutrons or gamma rays resulting from thermal neutron capture. The detection of these radioactive signals returning to the borehole provides information as to porosity, lithology and presence or absence of hydrocarbons within the investigated formations.

In the neutron induced gamma ray well logging instrument commonly used, a neutron generator is pulsed at a rate up to approximately 20 KHz. Each neutron burst produces inelastically scattered gamma radiation which is detected during a time interval coinciding with each emission of neutrons from the neutron source and thermal neutron capture gamma radiation which is detected during a time interval subsequent to the cessation of each neutron burst. A detection pulse is transmitted to surface electronics for processing during each of the two detection intervals along with a synchronization pulse. The synchronization pulses are used in the surface electronics to route the pulse occurring during the inelastically scattered detection interval to one section of a multi-channel analyzer. Similarly, the pulse occurring in the thermal neutron capture detection interval is routed into another section of the multi-channel analyzer. The use of memory, address decoders, subtractors and ratio circuits enables information to be obtained indicative of selected borehole and formation characteristics.

It is known that at a pulsed source repetition rate of approximately 20 KHz, the neutron induced gamma ray well logging instrument must traverse the borehole at a rate of speed of less than five feet per minute to obtain reliable information. At increased logging speeds the information obtained is significantly inferior due to insufficient numbers of neutrons bombarding the formation intervals and decreased count rates of the detected gamma rays. Thus increase in logging speed requires a proportional increase in the pulse repetition rate of the neutron source.

Increasing the pulse repetition rate of the neutron source significantly decreases the time available for the detection of returning radiation. As a result the time interval separating the inelastic gamma ray detection interval and the thermal neutron capture gamma ray detection interval is greatly reduced. A reduction in the time interval separating the two detection intervals results in, the pulses detected within each interval being more likely to pile-up or spread into one another during transmission to the surface electronics over the logging cable. Such pulse spreading results in what appears at the surface to be one large pulse rather than separate and independent pulses. The energies measured in the distorted pulse are no longer directly related to elements within the neutron irradiated subsurface earth formations and thus are unsuited for use in evaluating these formations.

Accordingly, at increased pulse repetition rates of a neutron source it is difficult to establish accurate measurements of the borehole and formation characteristics. This and other disadvantages are overcome with the present invention by providing a method and apparatus for operating a pulsed neutron source at relatively high repetition rates without suffering pulse pile-up of the detected pulses during transmission over the logging cable.

SUMMARY OF THE INVENTION

The present invention provides improved method and apparatus for pulsed neutron gamma ray logging. A neutron generator located in a well logging instrument is repeatedly pulsed at a predetermined repetition rate. Each burst of high energy neutrons produces inelastically scattered gamma rays and thermal neutron capture gamma rays. Inelastically scattered gamma rays are detected only during a detection time interval coinciding with the neutron source pulsing for a predetermined plurality of neutron generator bursts. Capture gamma rays are detected only during a detection time interval subsequent to the cessation of the neutron bursts for a second predetermined plurality of neutron generator bursts. For each detection interval only a single pulse is transmitted to the surface. Sync pulses generated in the well logging instrument are scaled to a lower frequency and transmitted to the surface along with the detection pulses. The sync pulses are used in the surface electronic circuitry to direct pulses occurring in the inelastic detection time periods to one section of a multi-channel analyzer and pulses occurring in the capture detection time interval to another section of the multi-channel analyzer. Address decoders, subtractors and ratio circuits are used to generate signals representative of the presence and quantity of selected elements within the irradiated formations.

BRIEF DESCRIPTION OF THE DRAWINGS

FIGS. 4A–4H is a set of time aligned waveform diagrams at various signal points of the subsurface circuitry.

DETAILED DESCRIPTION OF THE PREFERRED EMBODIMENT

Figure 1:
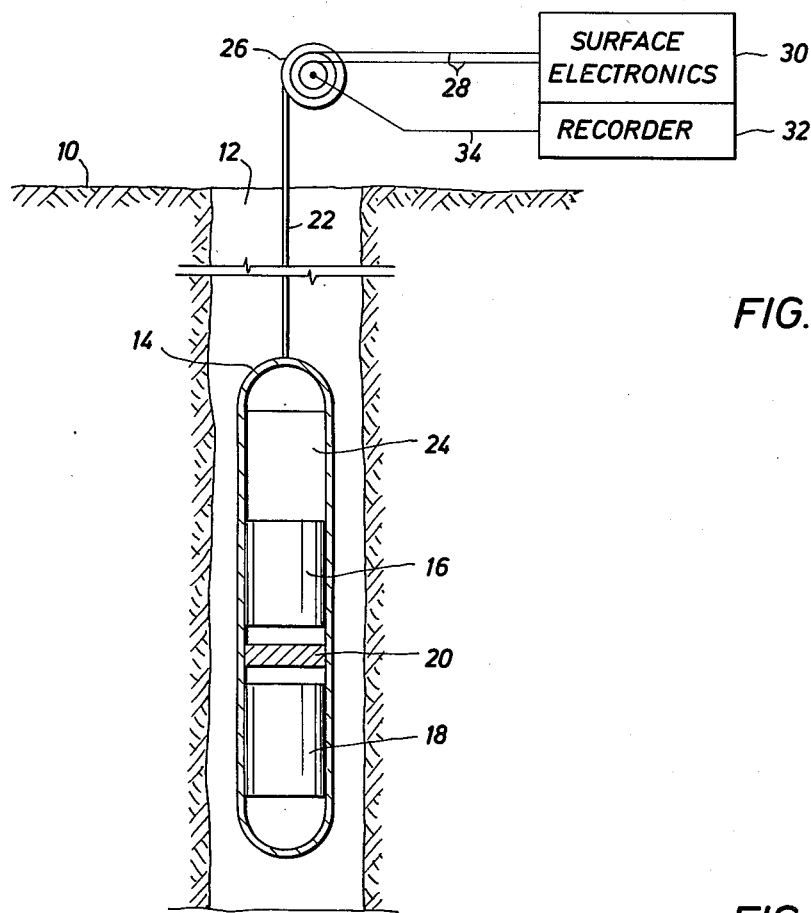
FIG. 1 is a side elevation, partly in cross-section, of a borehole logging instrument of the present invention.

Referring now to the drawings in more detail, particularly to FIG. 1, there is illustrated schematically a radioactivity well surveying operation in which a portion of the earth 10 is shown in vertical section. Well 12 penetrates the earth's surface and may or may not be cased. Disposed within well 12 is the subsurface instrument 14 of the well logging system. Subsurface instrument 14 includes a detecting system 16 and a pulsed neutron source 18 separated by radiation shield 20. Logging cable 22 suspends the instrument 14 in the well 12 and contains the required conductors for electrically connecting the subsurface electronics 24 of instrument 14 with the surface apparatus. The cable 22 is wound on or unwound from drum 26 in raising and lowering the instrument 14 to traverse the well 12.

In making a radioactivity log of the formations surrounding the well 12, instrument 14 is caused to traverse the well 12. Thereby neutrons from source 18 irradiate the formations surrounding the borehole and returning radiations influenced by the formations are detected by the detecting system 16. The resultant signals are sent to the subsurface electronics 24 for processing and transmission to the surface through cable 22. Through slip rings on the end of the drum 26, the signals are coupled by conductors 28 to the surface electronics 30, where such signals are processed and then recorded on recorder 32. Recorder 32 is also provided with a depth indication input on conductor 34 so that the data recorded on recorder 32 is in correlation with the depth of the instrument 14 as the instrument 14 traverses the well 12. The elements of FIG. 1 are shown diagrammatically, and it is to be understood that the associated circuits and power supplies are provided in a conventional manner. It is also to be understood that the instrument housing will be constructed to withstand the pressures and mechanical and thermal abuses encountered in logging a deep well and to provide adequate space within it to house the necessary apparatus and to permit the transmission of radiation therethrough.

Figure 2:
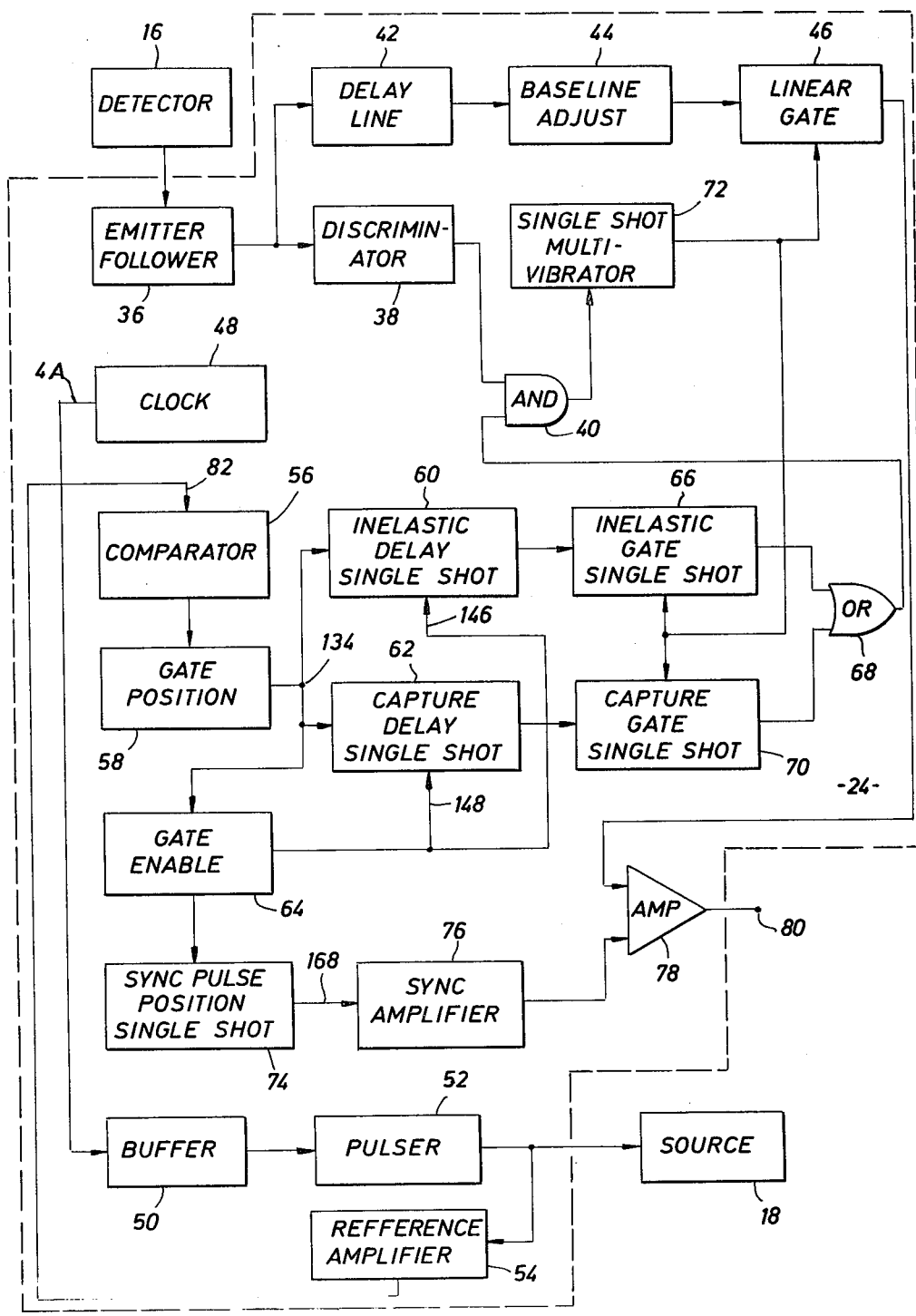
FIG. 2 is a block diagram of the subsurface circuitry of the instrument according to the present invention.

Referring now to FIG. 2, there is illustrated in block diagram form, the subsurface electronics 24 connected to the detector 16 and the source 18. Detector 16 is a scintillation counter arranged for gamma ray spectral analysis. In the preferred embodiment, detector 16 is a sodium-iodide crystal. The crystal is coupled to a photomultiplier tube, such as the model number 4523 available from The Radio Corporation of America. To protect the detector from high temperatures encountered in boreholes the detector may be mounted in a Dewar flask. The output of detector 16 is coupled into an emitter follower circuit 36 within the subsurface electronics section 24. The output of emitter follower circuit 36 is coupled into a discriminator circuit 38 which has the output coupled into one input of two-input AND gate 40. The discriminator circuit 38 is used to remove pulses having amplitudes below a selectable threshold value which might otherwise cause pile-up on the transmission line normally connected to output terminal 80. A discriminator setting of 400 kev is generally suitable for this purpose. The pulse output from emitter follower 36 is also coupled into delay line 42, which is normally set to cause a delay of 0.4 microseconds, the output of which is coupled into baseline adjust circuit 44 the output of which is coupled into linear gate circuit 46.

The output signal of clock circuit 48 is coupled to the input of buffer circuit 50 the output of which is coupled into source pulser circuit 52. The output of pulser circuit 52 is coupled to source 18 causing source 18 to emit a burst of high energy neutrons for a duration equal to the pulse time width from high voltage pulser circuit 52. Typically, source 18 will emit neutrons of an approximate energy level of 14 Mev for a time period of approximately 6 microseconds. The output of pulser circuit 52 is also coupled to the input of reference amplifier circuit 54, the output of which provides the input into comparator circuit 56. The output of comparator circuit 56 is coupled into gate position circuit 58, the output of which is coupled into the input of inelastic delay single shot circuit 60, capture delay single shot circuit 62 and gate enable circuit 64.

The output of inelastic delay single shot circuit 60 is coupled into inelastic gate single shot circuit 66 the output of which is coupled into one input of two-input OR gate 68. The output of capture delay single shot circuit 62 is coupled into capture gate single shot circuit 70 the output of which is coupled into the second input of OR gate 68. The output of OR gate 68 is coupled into the second input of AND gate 40 the output of which is connected to single shot multivibrator circuit 72. The output of single shot multivibrator circuit 72 is coupled into the "control" input of linear gate circuit 46, the "reset" input of inelastic gate single shot circuit 66 and the "reset" input of capture gate single shot circuit 70.

As stated previously, the input to gate enable circuit 64 is provided from the output of gate position circuit 58. One output of gate enable circuit 64 is coupled simultaneously to the "reset" input of capture delay single shot circuit 62 and to the "reset" input of inelastic delay single shot circuit 60. A second output of gate enable circuit 64 is coupled into sync pulse position single shot circuit 74 the output of which is coupled into the input of sync amplifier circuit 76. The output of sync amplifier circuit 76 provides one input to amplifier 78 the second input of which is provided by the output of linear gate circuit 46. The amplified output of amplifier 78 is connected to output terminal 80 for transmission be electrical conductors within cable 22 to the surface electronics 30 for further processing.

In the operation of the electronic circuitry of FIG. 2, pulses from clock circuit 48 (illustrated in FIG. 4A) pass through buffer circuit 50 to the input of pulser circuit 52. In the preferred embodiment, clock circuit 48 is set to operate at a frequency of approximately 50 KHz. The output from pulser circuit 52 is a high voltage pulse of approximately 20 Kv which causes an output of high energy neutrons from source 18 for approximately 6 microseconds duration at a repetition rate corresponding to the frequency of clock circuit 48. Irradiation of subsurface earth formations with high energy neutrons causes several nuclear reactions, including the inelastic scattering of gamma radiation and gamma radiation resulting from thermal neutron capture. As will be explained hereinafter, a first detection gating interval occurs during the time the neutron source is turned on to emit neutrons allowing for the detection of radioactivity resulting from inelastic scattering and a second detection gating interval occurs subsequent to the neutron source burst for the detection of radioactivity resulting from capture of thermal neutron. Gamma radiation from inelastic scattering and capture reactions impinge detector 16 and are coupled through emitter follower 36 into delay line 42 and discriminator circuit 38. Discriminator 38 removes pulses having amplitude below a selected threshold value which might otherwise cause pulse pile-up on the transmission line normally connected to output terminal 80. As mentioned previously, discriminator setting of 400 Kev is generally suitable for the purpose. Pulses exceeding the discriminator threshold provide one input to AND gate 40.

As previously stated, these detected radiation pulses are also coupled into delay line 42, which is nominally set to cause a delay of 0.4 microseconds. The delayed output signal is coupled into baseline adjust circuit 44 which is adjusted to remove non-linearity caused by the surface and the subsurface electronic circuits. The output signal from baseline adjust circuit 44 is coupled into an input of linear gate 46.

To provide for proper timing, the inelastic and the capture detection time intervals are referenced to the firing of the neutron source 18 by the output signal from reference amplifier 54 which is coupled into comparator circuit 56, where to provide noise immunity, the signal is compared to a fixed reference level. The output of comparator circuit 56 is connected to the input of gate position circuit 58. Gate position circuit 58 is an adjustable single shot multivibrator allowing for simultaneously positioning of both detection gates in relation to the firing of neutron source 18 while maintaining the desired time relationship between both detection gates. The output of gate position circuit 58 is simultaneously coupled to inelastic delay single shot circuit 60, capture delay single shot circuit 62 and gate enable circuit 64. Inelastic delay single shot circuit 60 is set to delay the start of the inelastic detection gate generated by inelastic gate single shot circuit 66 for a preset time after the commencement of firing of neutron source 18. This preset time is approximately equal to the turn on time of source 18. Inelastic gate single shot circuit 66 is set to provide a gate interval completely within the period of source activation. In the preferred embodiment, inelastic delay single shot circuit 60 is set to have a delay of approximately 2 microseconds from the time the output of pulser circuit 52 is applied to neutron source 18 and the inelastic detection gate is set to have a time interval of approximately 6 microseconds.

Capture delay single shot circuit 62 is set to delay the start of the capture detection gate generated by capture gate single shot circuit 70 for a preset time after the firing of neutron source 18. Capture gate single shot circuit 70 is set to provide a gate interval completely within a time period while the source being in an off condition. In the preferred embodiment, capture delay single shot circuit 62 is set to have a delay of approximately 12 microseconds from cessation of neutron source 18 and the capture detection gate is set to have a time interval of approximately 6 microseconds.

As previously mentioned, the output of gate position circuit 58 is also coupled into gate enable circuit 64. Gate enable circuit 64, which will be explained in more detail herein, is set to enable inelastic delay single shot circuit 60 for a preselected time interval while disabling capture delay single shot circuit 62 and to enable capture delay single shot circuit 62 for a preselected time interval while disabling inelastic delay single shot 60. By so doing only inelastic gamma radiation is measured for a preselected number of neutron source pulsings and only capture gamma radiation is measured for a second preselected number of neutron source pulsings. In the preferred embodiment the ratio of neutron source pulsings for detecting inelastically scattered gamma radiation to those used to detecting capture gamma radiation is approximately three-to-one. More specifically, for every eighty neutron source firings sixty firings are used exclusively for inelastic gamma radiation measurement and twenty firings are used exclusively for capture gamma radiation measurement.

When either an inelastic detection gate or a capture detection gate is generated it is applied to the second input of AND gate 40. The output signal from AND gate 40 triggers single shot multivibrator circuit 72 which is nominally set to have a 1.6 microsecond wide pulse output for controlling linear gate 46. The opening of linear gate 46 is thus synchronized with the pulsing of neutron source 18 to provide an inelastic gating interval or a capture gating interval. Inelastic gate single shot circuit 66 and capture gate single shot circuit 70 are resettable type multivibrators with a reset input of each connected to the output of single shot multivibrator circuit 72. The operation of the circuits are such that if a trigger pulse is applied to the reset input before the end of the cycle initiated by a previous trigger pulse the cycle time will reset and start over. Also, after the circuit is initiated by a trigger pulse the output will remain high until the end of the cycle time or until a reset pulse is applied, whichever occurs first. The result of this reset configuration is to clear the single shot as soon as the first gamma ray with energy above the discriminator threshold is detected. By using a multivibrator circuit with this reset function, the single shot provides the gate width timing signal for determining the maximum length of the detection gate and provide for terminating the gate when the first gamma ray pulse above the discriminator threshold is detected.

A second output from gate enable circuit 64 is connected to sync pulse position single shot 74. Gate enable circuit 64 is set to trigger sync pulse position single shot 74 approximately every 1600 microseconds. The sync pulse is amplified by amplifier circuit 76 and combined with the detection signal by summary amplifier 78 for coupling to the transmission line connected at output junction 80.

Figure 3:
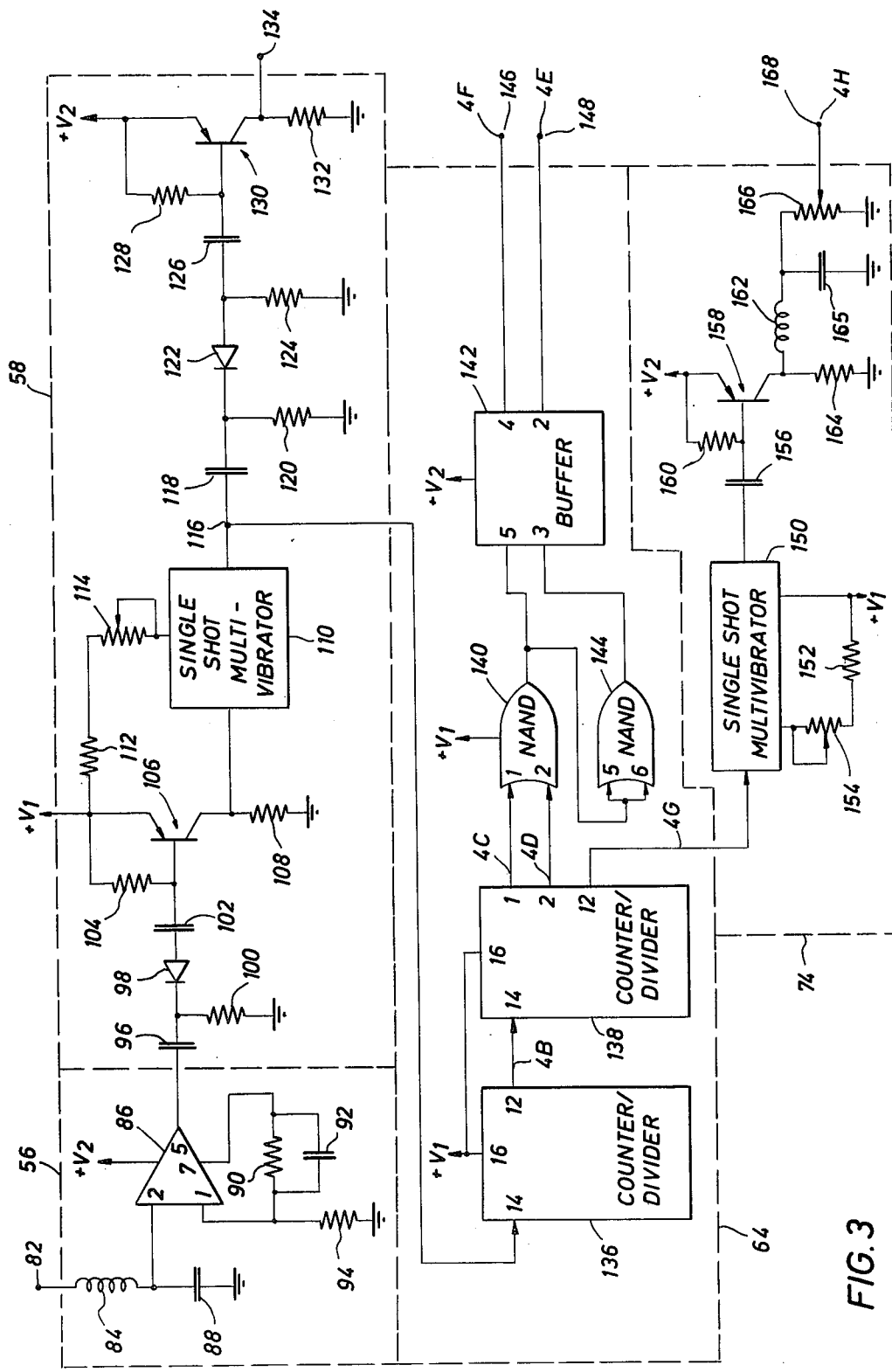
FIG. 3 is an electrical schematic of a portion of the subsurface circuitry of FIG. 2.

Turning now to FIG. 3, there is illustrated in greater detail a portion of subsurface electronics 24, specifically, comparator circuit 56, gate position circuit 58, gate enable circuit 64 and sync position single shot circuit 74. Comparator circuit 56 input junction 82 is connected to inductor 84 the other side of which connects to the input, pin 2, of comparator 86 and to capacitor 88 the other side of which connects to a common reference potential, such as, for example ground. Pin 1 of comparator 86 connects to pin 7 through resistor 90 and capacitor 92, connected electrically in parallel to one another, and is coupled to the common reference potential through resistor 94. The output of comparator 86 is coupled through capacitor 96 to the junction of diode 98 and resistor 100 the other side of which connects to the common reference potential. The anode of diode 98 connects through capacitor 102 to the junction of resistor 104 and the emitter of transistor 106. The other side of resistor 104 and the base of transistor 106 connect to a first positive voltage potential, $V_1$, in the preferred embodiment 15 v d.c. The collector of transistor 106 connects to the common reference potential through resistor 108 and further provides the input to single shot multivibrator 110.

Connected in series between the first positive voltage potential $V_1$ and single shot multivibrator 110 is resistor 112 and potentiometer 114. The output of single shot multivibrator 110 connects to junction 116 which connects to capacitor 118 the other side of which is connected to the common reference potential through resistor 120. The cathode of diode 122 connects to the junction of capacitor 118 and resistor 120 with the anode of diode 122 connecting to resistor 124, the other side of which connects to the common reference potential, and capacitor 126. The other side of capacitor 126 connects to one side of resistor 128, the other side of which connects to a second positive voltage potential, $V_2$, and to the base of transistor 130. The emitter of transistor 130 also connects to the second positive voltage potential $V_2$, which preferably consists of a +5 V d.c. source. The collector of transistor 130 connects through resistor 132 to the common reference potential and to output terminal 134 which provides an input to inelastic delay single shot circuit 60 and capture delay single shot circuit 62, illustrated in FIG. 2.

The output of single shot multivibrator 110 connected to junction 116 is further coupled into the input of counter/divider 136. The output of counter/divider 136 is coupled to the input of counter/divider 138. A first output, pin 1, of counter/divider 138 is coupled to a first input of two-input NAND gate 140 and a second output, pin 2, of counter/divider 138 is coupled to a second input of NAND gate 140. The output of NAND gate 140 is coupled into buffer 142 and is coupled simultaneously into both inputs of two-input NAND gate 144 the output of which is coupled into buffer 142. A first output, pin 4, of buffer 142 connects to terminal 146 which is an input to inelastic delay single shot circuit 60, the second output, pin 2, of buffer 142 connects to terminal 148, an input to capture delay single shot circuit 62.

A third output from counter/divider 138, pin 12, provides the input to single shot multivibrator 150. Connected serially between the first positive voltage potential, $V_1$ and single shot multivibrator 150 is resistor 152 and potentiometer 154. The output of single shot multivibrator 150 is coupled through capacitor 156 to the base of transistor 158. The base of transistor 158 also connects to the second positive voltage potential, $V_2$, through resistor 160. Additionally, the emitter of transistor 158 connects to the second positive voltage potential, $V_2$. The collector of transistor 158 connects to the junction of inductor 162 and resistor 164, the other side of which connects to the common reference potential. The other side of inductor 162 connects to the junction of capacitor 164 and potentiometer 166, the other side of both connecting to the common reference potential. The arm of potentiometer 166 connects to terminal 168 which is the input to sync amplifier circuit 76 of FIG. 2. Table I provides a listing of components used in the preferred embodiment of the circuitry illustrated in FIG. 3.

TABLE I

| Circuit | Part Number | Manufacture |
| --- | --- | --- |
| comparator 86 | LM 161H | National Semiconductor Corp. |
| single shot 110 and 150 | MC 14538 | Motorola, Inc. |
| counter/divider 136 | CD 4017 | Radio Corporation of America |
| counter/divider 138 | CD 4022 | Radio Corporation of America |
| buffer 142 | CD 4050 | Radio Corporation of America |
| NAND gate 140 and 144 | CD 4001 | Radio Corporation of America |

The operation of the detailed circuitry of FIG. 3 can best be explained in conjunction with the waveform diagrams of FIG. 4. The input to comparator circuit 56, at terminal 82, consists of a series of pulses from reference amplifier 54. These pulses are at a 50 KHz pulse rate corresponding to the output of clock circuit 48, as illustrated in FIG. 4A. The pulses are coupled into comparator 86 where they are compared to a preselected reference value, such as, for example a value equal to approximately 80% of the typical peak amplitude value of the output of reference amplifier 54. The pulse output of comparator 86 is coupled through transistor 106 to the input of single shot multivibrator 110. Potentiometer 114 is connected serially with resistor 112 between the first positive voltage level, $V_1$, and single shot multivibrator 110 and is adjusted to change the timing of the output from single shot multivibrator 110. In the preferred embodiment the output from single shot multivibrator is a 20 microsecond gate referenced to the pulsing of the source.

The output from single shot multivibrator 110 is coupled through transistor 130 to terminal 134 which connects to the "D" input of capture delay single shot circuit 62 and the "D" input of inelastic delay single shot circuit 60. The output from single shot multivibrator 110 also couples to the "clock" the input, pin 14, of counter/divider 136. The output, pin 12, of counter/divider 136, represented in FIG. 4B, is a 200 microsecond square wave which is coupled into the "clock" input, pin 14, of counter/divider 138. Counter/divider 138 consists of a divide-by-8 counter. The decode gating outputs of counter/divider 138 are normally "low" and go "high" only at their respective decoded time slots. Each diode gate output remains "high" for one full clock cycle. The output of pin 1 of counter/divider 138 represents the "1" output and is illustrated in FIG. 4C. The output at pin 2 of counter/divider 138 represents the "0" output and is illustrated in FIG. 4D. Additionally, the carryout signal, pin 12, completes one cycle every eight clock input cycles, this output signal illustrated in FIG. 4G, being "high" for 800 microseconds and "low" for 800 microseconds. The output of pin 1 will be "high" for ten clock transitions on input, pin 14, and the output of pin 2 will be "high" for the next ten clock pulses on the input, pin 14.

The two output signals from pins 1 and 2, of counter/divider 138 are coupled to the two inputs of NAND gate 140 causing the output thereof to be "low" for a time equivalent to twenty input pulses on pin 14 of counter/divider 138. This output will be low for 400 microseconds in the preferred embodiment. The output from NAND gate 140 is coupled into one input, pin 5, of buffer 142. Buffer 142 is preferably a non-inverting hex buffer/converter which converts the input level to a suitable output level. As illustrated the input signal level of between 0 and $+V_1$ will be converted to between 0 and $+V_2$. The output, pin 4, as illustrated in FIG. 4F, is then coupled to the "reset" input of inelastic delay single shot circuit 60. This signal will disable the inelastic delay single shot circuit 60 for twenty clock pulses corresponding to twenty source pulsings.

The output of NAND gate 140 is also coupled into both inputs of NAND gate 144 the output of which will appear inverted. The output of NAND gate 144 is coupled a second input, pin 3, of buffer 142, the output of which will appear as the inversion of the first output, pin 4, FIG. 4E. This output is coupled to the "reset" input of capture delay single shot circuit 62 and will disable the capture delay single shot circuit for sixty clock pulses. Thus there has been described and illustrated circuitry whereby only a capture measurement will be made exclusively for twenty, source firing, or approximately 25% of the total source firings, with an inelastic measurement made exclusively for sixty source firings, or approximately 75% of the total source firings.

The output of counter/divider 138, pin 12, illustrated in FIG. 4G, is coupled into the input of single shot multivibrator 150. The output of single shot multivibrator 150 is coupled through transistor 158 and its associated circuitry to output terminal 168. The signal at terminal 168 represents a sync pulse every 1600 microseconds, as illustrated in FIG. 4H. The sync pulse is coupled into summing amplifier 78 by sync amplifier 76 for transmission along with the detected pulses to the surface electronics.

Figure 5:
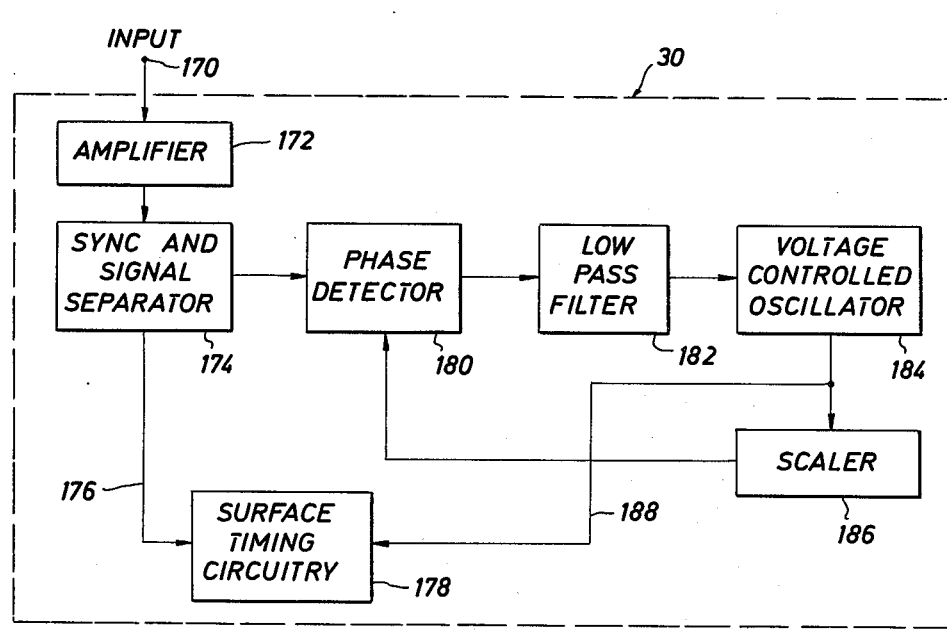
FIG. 5 is a block diagram of the surface circuitry according to the present invention.

Referring now to FIG. 5, the surface electronic circuitry 30 is illustrated in greater detail. Pulses from the electrical conductor within logging cable 22 are coupled through input terminal 170 into amplifier circuit 172 whose output signal is coupled into a sync and signal separator circuit 174. If the sync pulses and signal pulses are of opposite polarity, they can be separated by polarity-sensitive circuitry, and if they are of the same polarity, they can be separated by a voltage discriminator circuit. In a preferred embodiment, the sync signal is transmitted with a polarity opposite from that of the detected pulses. If desired, the detector gate intervals can also be gated off during the sync transmission interval. The detector signals are coupled from the sync and signal separator circuit 174 an electrical conductor 176 into the surface ming circuitry 178. The sync signals from the sync and signal separator circuit 174 are coupled into a phase detector circuit 180, the output signal of which is coupled through a low pass filter circuit 182 into a voltage controlled oscillator circuit 184. The output signal from the voltage controlled oscillator circuit 184 is coupled into a scaler output 186 and also into the surface timing circuitry 178 by electrical conductor 188. The output signal of the scaler circuit 186 is coupled back into phase detector circuit 180.

In the operation of the circuitry illustrated in FIG. 5, the combined sync pulses and signal pulses are coupled into sync and signal separator circuit 174 where the sync pulses are separated and shaped to provide a reference frequency for the phase detector circuit 180. The phase detector output signal is filtered and used as the controlling voltage for the voltage controlled oscillator circuit 184. The oscillator output signal is scaled by a frequency divider and coupled into the second input of the phase detector circuit 180. When the loop is in phase lock, the voltage controlled oscillator 184 output signal frequency is equal to the product of the reference input frequency and the scaler ratio. Thus, if the subsurface system operates at a clock frequency of 50 KHz and the sync pulses are scaled and transmitted at a 500 Hz signal, now in phase lock with the subsurface clock circuit, provides the synchronization between the subsurface and the surface systems. A more detailed description of the sync transmission system can be found in U.S. Pat. No. 4,168,428, issued to R. B. Culver, which is incorporated herein by reference.

The conductors 176 and 188 are coupled into the surface timing circuitry 178, which includes a multi-channel analyzer and a plurality of address decoders and processing circuitry. The operation of the multi-channel analyzer and the address decoders is explained in detail in U.S. Pat. No. 4,013,874, issued to R. B. Culver, which is incorporated herein by reference. Briefly, the outputs of a multi-channel analyzer are coupled to a plurality of address decoders, one such address decoder being provided for each energy range of interest in the spectrum of the detected gamma rays produced, or occurring, in the formations surrounding a borehole. The output of the address decoders provide information with regard to carbon, oxygen, silicon, calcium and other elements of interest. These signals can be further processed by taking ratios of two or more of the signals or can be corrected using compensation factors or can be recorded directly.

Thus, there has been described and illustrated herein a system in accordance with the present invention where a new and improved method and apparatus are described which provide neutron induced gamma ray well logging. However, those skilled in the art will recognize that obvious modifications can be made without departing from the spirit of the invention. Accordingly, it should be clearly understood that the forms of the invention described and illustrated are exemplary only and are not intended as limitations an the scope of the present invention.

The embodiment of the invention in which an exclusive property or privilege is claimed are defined as follows:

1. A method for logging formations surrounding a borehole, comprising the steps of:
   irradiating said formations with a first series of bursts of high energy neutrons;
   detecting radiation emanating from said formations during said first series of bursts of neutrons;
   irradiating said formations with a second series of bursts of high energy neutrons; and
   detecting radiation emanating from said formations subsequent to said second series of bursts of neutrons.

2. The method in accordance with claim 1 wherein said radiation detected during said first series of bursts of neutrons is representative of inelastically scattered gamma radiation.

3. The method in accordance with claim 2 wherein said radiation detected subsequent to said second series of bursts of neutrons is representative of thermal neutron capture gamma radiation.

4. A method of investigating the environments surrounding a borehole, comprising the steps of:
   cyclically irradiating said environments with time spaced bursts of high energy neutrons;
   detecting radiation emanating from said environments during a first plurality of said bursts of high energy neutrons;
   detecting radiation emanating from said environments subsequent to a second plurality of said bursts of high energy neutrons;
   deriving a spectral representation of said radiation detected during said first plurality of bursts of high energy neutrons; and
   deriving a spectral representation of said radiation detected subsequent to said second plurality of bursts high energy neutrons.

5. The method in accordance with claim 4 wherein said radiation detected during said first plurality of bursts is inelastically scattered gamma radiation.

6. The method in accordance with claim 5 wherein said radiation detected subsequent to said second plurality of bursts is thermal neutron capture gamma radiation.

7. The method in accordance with claim 6 wherein said first plurality of neutron bursts comprises approximately seventy-five percent of the total bursts of an irradiation cycle.

8. The method in accordance with claim 7 wherein said second plurality of neutron bursts comprises approximately twenty-five percent of the total bursts of an irradiating cycle.

9. The method in accordance with claim 6 wherein each irradiating cycle has eighty neutron bursts.

10. The method according to claim 9 wherein said inelastically scattered gamma radiation is detected during sixty bursts of neutrons.

11. The method according to claim 10 wherein said thermal neutron capture gamma radiation is detected subsequent to twenty bursts of neutrons.

12. The method according to claim 8 or 9 wherein an irradiating cycle of neutron bursts is approximately 1600 microseconds in duration.

13. A method for surveying earth materials, comprising the steps of:
   cyclically irradiating said earth materials with a succession of bursts of neutrons;
   detecting inelastically scattered gamma radiation during a predetermined number of said bursts;
   detecting thermal neutron capture gamma radiation subsequent to a second predetermined number of said bursts;
   generating a spectral representation of said detected inelastically scattered gamma radiation; and
   generating a spectral representation of said detected thermal capture gamma radiation.

14. The method of claim 13 wherein said inelastically scattered gamma radiation is detected during approximately seventy-five percent of said succession of bursts of neutrons and said thermal neutron capture gamma radiation is detected subsequent to approximately twenty-five percent of said succession of bursts of neutrons.

15. The method in accordance with claim 14 wherein an irradiating cycle comprises eighty bursts of neutron over a time duration of 1600 microseconds.

16. The method in accordance with claim 15 wherein said inelastically scattered gamma radiation is detected during approximately sixty bursts of neutrons.

17. The method in accordance with claim 16 wherein said thermal neutron capture gamma radiation is detected subsequent to approximately twenty bursts of neutrons.

18. Apparatus for logging formations surrounding a borehole, comprising:
   a source for irradiating said formations with a series of bursts of high energy neutrons;
   a radiation detector for detecting radiation emanating from said formations; and
   means for generating a first electrical signal functionally related to the radiation detected during a first plurality of said bursts and a second electrical signal functionally related to the radiation detected subsequent to a second plurality of said bursts.

19. The apparatus in accordance with claim 18 wherein said radiation detected during said first plurality of bursts is representative of inelastically scattered gamma radiation.

20. The apparatus in accordance to claim 19 wherein said radiation detected during said second plurality of bursts is representative of thermal neutron capture gamma radiation.

21. The apparatus for investigating the environments surrounding a borehole, comprising:
   means for cyclically irradiating said environments with a succession of time-spaced bursts of high energy neutron;
   means for detecting radiation emanating from said environments;
   means for deriving a spectral representation of the radiation detected during a first plurality of bursts of high energy neutrons; and
   means for deriving a spectral representation of the radiation detected subsequent to a second plurality of bursts of high energy neutrons.

22. The apparatus in accordance with claim 21, wherein said radiation detected during said first plurality of bursts is inelastically scattered gamma radiation.

23. The apparatus in accordance with claim 22, wherein said radiation detected during said second plurality of bursts is thermal neutron capture gamma radiation.

24. The apparatus in accordance with claim 23 wherein said inelastically scattered gamma radiation is detected during approximately seventy-five percent of said succession of bursts of neutrons and said thermal neutron capture gamma radiation is detected subsequent to approximately twenty-five percent of said succession of bursts of neutrons.

25. The apparatus in accordance with claim 24 wherein an irradiating cycle comprises eightly bursts of neutron.

26. The apparatus in accordance with claim 25 wherein said inelastically scattered gamma radiation is detected during approximately sixty bursts of neutrons.

27. The apparatus in accordance with claim 26 wherein said thermal neutron capture gamma radiation is detected subsequent to approximately twenty bursts of neutrons.

28. The apparatus in accordance with claim 27 wherein said irradiating cycles comprises a time duration of 1600 microseconds.

* * * * *